UNITED STATES PATENT OFFICE.

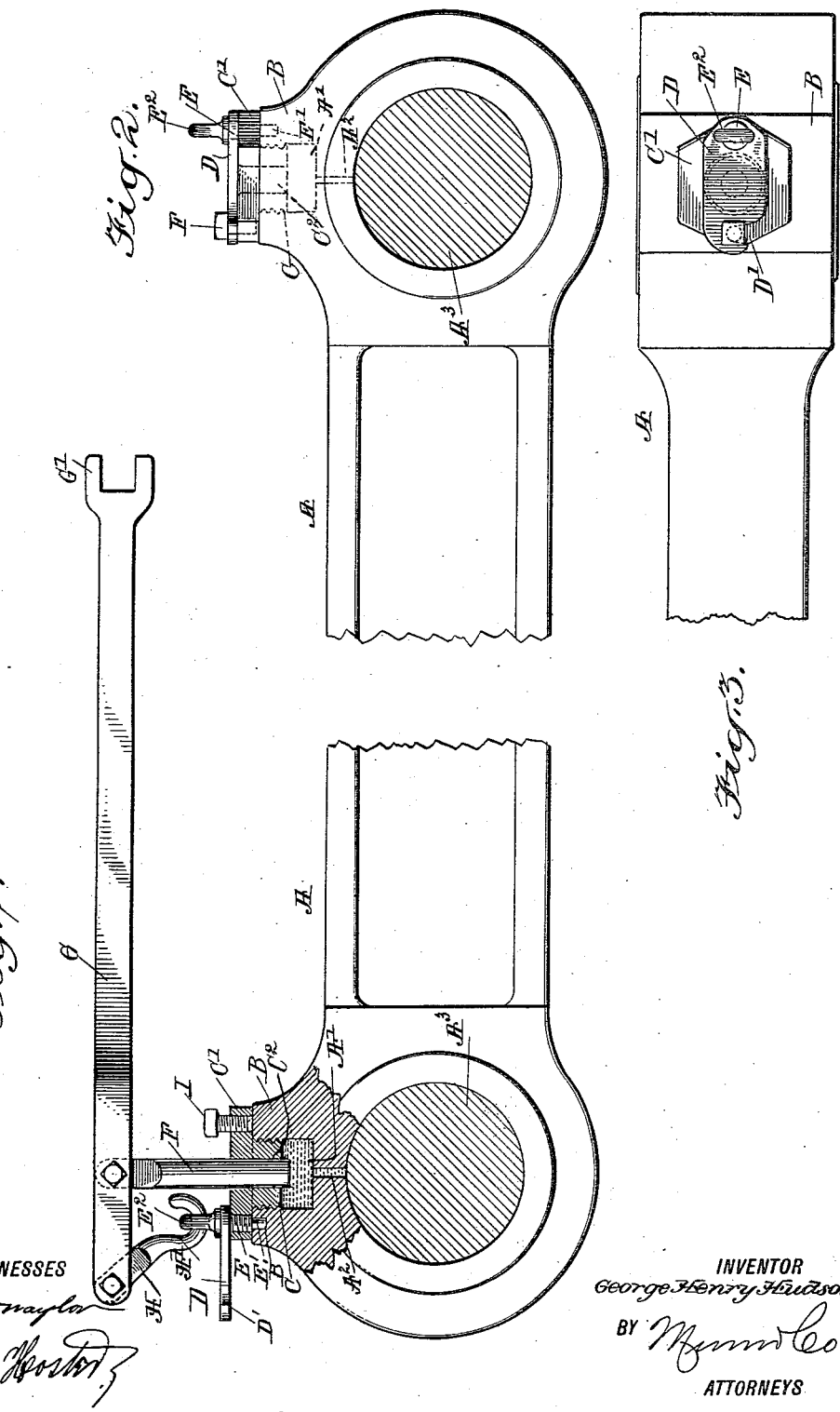

GEORGE HENRY HUDSON, OF NEW YORK, N. Y., ASSIGNOR OF ONE-HALF TO JOHN McTERNAN, OF NEW YORK, N. Y.

GREASE-CUP PLUG.

1,022,317.

Specification of Letters Patent.

Patented Apr. 2, 1912.

Application filed May 10, 1911. Serial No. 626,158.

*To all whom it may concern:*

Be it known that I, GEORGE HENRY HUDSON, a citizen of the United States, and a resident of the city of New York, borough of the Bronx, in the county and State of New York, have invented a new and Improved Grease-Cup Plug, of which the following is a full, clear, and exact description.

The object of the invention is to provide a new and improved grease cup plug, more especially designed for use on connecting rods of locomotive engines, and other machines and parts, and arranged to allow of conveniently filling the cup with grease without removing the plug from the connecting rod or other part of which it forms a permanent fixture.

For the purpose described, the plug is permanently fastened in place, and is provided with a bore, and a cover, the pivot of which forms the fulcrum for a link connected with a hand lever carrying a plunger adapted to pass into the bore of the plug to force the grease down in the plug.

A practical embodiment of the invention is represented in the accompanying drawings forming a part of this specification, in which similar characters of reference indicate corresponding parts in all the views.

Figure 1 is a sectional side elevation of the grease cup plug as applied to one end of a connecting rod; Fig. 2 is a side elevation of the grease cup plug applied to the other end of the connecting rod, the wrist pin being shown in section; and Fig. 3 is a plan view of the same.

Each end of the connecting rod A shown in the drawings is provided on top with a boss B in which screws a plug C provided with a flange C' resting on top of the boss B, and the said plug C is provided with a central bore $C^2$ for the reception of the grease to be forced down into the cup A' formed in the connecting rod and having a small opening $A^2$ leading to the wrist pin $A^3$, as plainly indicated in Fig. 1. The upper end of the bore $C^2$ is adapted to be closed by a cover D mounted to swing on a pivot E screwing in the flange C' and terminating in a pin E' engaging a recess B' formed in the boss B, so as to hold the plug C against accidentally unscrewing in the boss B.

When the cover D is open then the grease is passed into the bore $C^2$, and in order to force this grease from the bore $C^2$ into the cup A', use is made of a plunger F adapted to pass into the bore $C^2$ and pivotally connected with a lever G provided at one end with a pivoted link H terminating in a hook H' adapted to engage an eye $E^2$ formed in the upper end of the pivot E for the cover D. Thus by the operator engaging the link H with the eye $E^2$ and passing the plunger F into the bore $C^2$ and bearing down on the lever G, the plunger forces the grease down in the bore $C^2$ for filling the cup A'.

It is understood that after the grease has been forced down, and the lever G has been swung upward to disengage the plunger F from the bore $C^2$, one may then refill the upper end of the bore $C^2$ with grease, and again engage the plunger F with the bore $C^2$, and bear down on the lever G. This operation is repeated as often as is necessary until the cup A' is completely filled with grease, and when this has been done the lever G is swung upward to disengage the plunger F from the bore $C^2$, and then the link H is unhooked from the eye $E^2$, after which the cover D is swung into a closed position over the bore $C^2$ and fastened in place by a screw I screwing in the flange C' and engaging a recess D' in the free end of the cover D. The lever G is provided with a wrench head G' for turning the cover-fastening screw I to unlock the cover D, or to fasten the same in place on the flange C'.

It is understood that by the arrangement described the cup can be filled with grease and without removing the plug from connecting rod, of which the plug really forms a permanent fixture.

It will also be noticed that the cup can be readily filled at any time with grease by unlocking the cover D and swinging the same into an open position and then applying the link H to the eye $E^2$ and making use of the lever G and plunger F as above described.

Having thus described my invention, I claim as new and desire to secure by Letters Patent:

1. The combination with a grease cup, of a plug therefor having a bore, a cover for opening and closing said bore, and a stud forming, with said cover, a permanent part of the plug, in combination with a plunger adapted to pass into the bore when the latter is open, and a lever on which the plunger is pivoted provided also with a member engageable with said stud.

2. The combination with a grease cup, of a plug therefor having a bore, a pivot on the grease cup and provided with an eye, and a cover mounted to swing on the said pivot for closing or opening the bore, in combination with a plunger adapted to pass into the said bore, a lever on which the plunger is pivoted, and a link pivotally connected with the said lever and provided with a hook adapted to hook onto the said eye.

3. The combination with a grease cup, of a plug therefor having a flange and an exterior thread for screwing the plug in position on a member, the plug having a bore for the reception of the grease, a pivot screwing in the said flange and having a pin engaging a recess in the said member to hold the plug against unscrewing, a cover mounted to swing on the said pivot and over the top of the flange, and means for fastening the free end of the cover in position on the said flange.

4. The combination with a grease cup, of a plug therefor having a flange and an exterior thread for screwing the plug in position on a member, the plug having a bore for the reception of the grease, a pivot screwing in the said flange and having a pin engaging a recess in the said member to hold the plug against unscrewing, the said pivot having an eye, and a cover mounted to swing on the said pivot to open and close the said bore, in combination with a plunger adapted to engage the said bore at the time the cover is open, a lever on which the plunger is pivoted, and a link pivoted on the said lever and having a hook adapted to engage the said eye.

In testimony whereof I have signed my name to this specification in the presence of two subscribing witnesses.

GEORGE HENRY HUDSON.

Witnesses:
JAMES L. DOWNS,
PATK. McTERNAN.

---

Copies of this patent may be obtained for five cents each, by addressing the "Commissioner of Patents, Washington, D. C."